United States Patent Office 3,308,019
Patented Mar. 7, 1967

3,308,019
ALKYL - N - [α,α - DIMETHYL - β - (p - HALOPHEN-YL) - ETHYL] - CARBAMATES AND COMPOSITIONS THEREOF
Rudolf Kopf, Bergisch-Gladbach, Karl-Heinz Boltze, Cologne-Mulheim, Dietrich Lorenz, Kleinhurden Post, Bensberg, and Johannes Mühlenbein, Bergisch-Gladbach, Germany, assignors to Tropon Dinklage & Co., Cologne-Mulheim, Germany, a corporation
No Drawing. Filed Sept. 16, 1963, Ser. No. 309,341
Claims priority, application Germany, July 11, 1961,
T 20,422
10 Claims. (Cl. 167—55)

The present invention relates to a new group of chemical compounds N-(phenylethyl)-carbamic acid esters, characterized by improved properties as appetite curtailing agents and to processes for their manufacture. This application is a continuation-in-part of application Serial No. 208,933, filed July 10, 1962, now abandoned.

Amines having a sympathomimetic action have been used and are being used for curtailing appetite, i.e., as appetite-reducing agents. Examples of such amines are: amphetamine, metamphetamine, phentermine, and chlorophentermine. Unfortunately, these amines possess definitely unpleasant side reactions, such as a blood pressure increasing effect, a heart beat rate increasing effect, reduction of intestinal motility, gastric distress, excitation of the central nervous system producing jitteriness, nervous tension, loss of sleep, and euphoria, etc. and further danger of addiction, particularly because of the central nervous system excitation, has to be taken into account. For these reasons, it has been conventional to administer these amine compounds in a form in which the active substance is only liberated slowly into the gastrointestinal tract. While the side effects are reduced in this manner so is the desired reduction in appetite.

It has now surprisingly been found that if the hydrogen atom attached to the nitrogen atom in certain of the amines of the above type is substituted for by a carbalkoxy radical, compounds characterized by substantially less pronounced side effects and in which the appetite reducing effect is not impaired substantially are obtained.

Because the toxicity is considerably reduced a class of compounds is thus made available which has a greater therapeutic range and is thus much safer to administer. Thus, it has been found that in the compounds so substituted, the excitory effect on the central nervous system is reduced to such a degree that the compounds no longer possess a measurable excitory action even when they are administered in lethal doses.

The substituted N-(phenylethyl) carbamic acid esters of the invention are represented by the following general formula

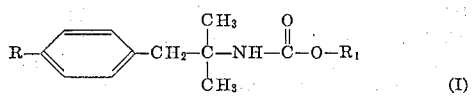

(I)

wherein R represents hydrogen or halogen and $R_1$ represents a straight-chain alkyl radical of from 1 to 3 carbon atoms. Included in the group R are chlorine, bromine, fluorine, and the like.

In accordance with the present invention, the substituted N-(phenylethyl)-carbamic acid esters can be prepared by a number of alternate, but equivalent reactions: the new N-(phenylethyl)-carbamic acid esters can be prepared by reacting an amine of the general formula:

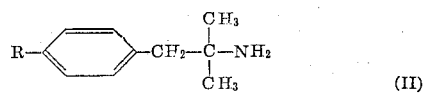

(II)

in which R is as above-defined, either, directly with a chloroformic acid ester of the general formula $ClCOOR_1$, in which $R_1$ is as above defined or with the corresponding carbonic acid dialkyl ester. Alternatively, an amine of the general Formula II (above) can be first converted into its corresponding urea derivative and the derivative thereafter reacted with an alcohol, or an amine of Formula II (above) can be converted with phosgene into the corresponding carbamic acid chloride which is then reacted either directly with the corresponding alcohol or converted by splitting off hydrogen halide into the corresponding isocyanate and then reacted with $R_1OH$.

A part of the starting amines used in the preparation of the compounds of the invention have not as yet been described in the literature. However, they may easily be obtained by procedures known per se. Thus, for example, by the conversion of a corresponding alcohol of the general formula

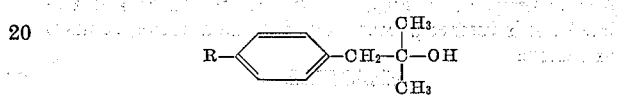

with hydrocyanic acid or with an alkali-cyanide in the presence of a strong acid and glacial acetic acid, there is formed, first of all a formamide of the general formula:

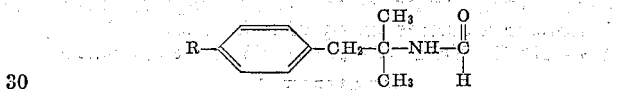

Hydrolysis of the formamide by boiling with strong mineral acids or alkali produces the starting amine.

The following examples illustrate satisfactory procedures for the manufacture of substituted N-(phenylethyl)-carbamic acid esters in accordance with the invention but it is to be understood that they are presented only for the purpose of illustration and not as indicating the limits of the invention.

EXAMPLE 1

Ethyl-N-[α,α-dimethyl-β-phenylethyl]carbamate

A solution of 11.3 g. of ethyl chloroformate in 15 ml. of diethyl ether is introduced dropwise into a solution of 29.8 g. of α,α-dimethyl-β-phenylethyl amine in 150 ml. of diethyl ether with stirring and cooling with ice. Half the quantity of amine introduced precipitates as hydrochloride, which is suction-filtered and washed with ether. After concentrating the combined mother liquors by evaporation and distilling under high vacuum, 21.3 g. (=95% of the theoretical of the quantity of reacted amine) of ethyl N-(α,α-dimethyl-β-phenylethyl)-carbamate are obtained with a $B.P._{0.05}$ of 75–77° C.

EXAMPLE 2

Ethyl-N-[α,α-dimethyl-β-(p-chlorophenyl)-ethyl]carbamate

A solution of 12.3 g. of α,α-dimethyl-β-(p-chlorophenyl)ethylamine in 80 ml. of alcohol is quickly added to a solution of 8.2 g. of ethyl chloroformate in 80 ml. of ethyl alcohol (96%) with stirring and ice cooling, then a saturated aqueous solution of 7 g. of potassium bicarbonate is added during 20 minutes and stirring is continued for another 2 hours at room temperature. After distilling off the alcohol in vacuum, extracting the oily residue with ether, drying the ethereal phase over sodium sulphate and distilling under high vacuum, 15.9 g. (=92% of the theoretical) of ethyl N-[α,α-dimethyl-β-(p-chlorophenyl)-ethyl]-carbamate are obtained with a $B.P._{0.005}$ of 88–90° C. and an M.P. of 52.5–53° C.

EXAMPLE 3

*Ethyl-N-[α,α-dimethyl-β-(p-chlorophenyl)-ethyl]carbamate*

6.3 g. of α,α-dimethyl-β-(p-chlorophenyl)-ethyl isocyanate are mixed with 10 ml. of absolute alcohol and after standing for several hours, the mixture is concentrated by evaporation and distilled under high vacuum. 6.6 g.=86% of the theoretical are obtained.

The α,α-dimethyl-β-(p-chlorophenyl)-ethyl isocyanate used as starting product is prepared as follows:

A solution of α,α-dimethyl-β-(p-chlorophenyl)ethyl amine in ethylene chloride is slowly added dropwise to a solution of phosgene in ethylene chloride while stirring and cooling with ice. After filtering off the precipitate (hydrochloride of the initial amine) and vacuum concentration of the filtrate, the residue is extracted with petrol. The residue which is insoluble in petrol consists of the starting amine and N,N-bis-[α,α-dimethyl-β-(p-chlorophenyl)-ethyl]urea (M.P. 214–215° C.). The petrol solution is concentrated by evaporation. α,α-Dimethyl-β-(p-chlorophenyl) ethyl isocyanate, which is not isolated but is further processed as indicated above, remains as residue.

EXAMPLE 4

*n-Propyl-N[α,α-dimethyl-β-(p-chlorophenyl)ethyl]-carbamate*

This is obtained from 18.4 g. of α,α-dimethyl-β-(p-chlorophenyl) ethylamine and 6.3 g. of n-propyl chloroformate, in a manner analogous to Example 1. $B.P._{0.15}$ 119–121° C. Yield: 10.8 g. (=80% of the theoretical).

EXAMPLE 5

*Methyl-N-[α,α-dimethyl-β-(p-chlorophenyl)-ethyl]carbamate*

This is obtained in a manner analogous to Example 1, from 20.8 g. of methyl chloroformate and 36.7 g. of α,α-dimethyl-β-(p-chlorophenyl) ethyl amine. M.P. 58–59° C. Yield: 32.8 g.=75.5% of the theoretical.

EXAMPLE 6

(A) *α,α-Dimethyl-β-[p-bromo-phenyl]-ethylamine hydrochloride*

2.5 g. sodium-cyanide are dissolved with strong cooling and stirring in glacial acetic acid and to the resulting solution there is added in dropwise fashion a mixture of 6 ml. glacial acetic acid and 12 g. concentrated sulfuric acid. Thereafter, still dropwise, and under slight warming, 10.5 g. α,α-dimethyl-p-bromophenyl-ethyl-alcohol is added and the mixture thereby produced moderately heated for sometime. The reaction solution is thereafter poured onto ice, neutralized with soda and extracted with ether. The ethereal extract is dried using sodium sulfate and the ether evaporated. The N-[α,α-dimethyl-(p-bromophenyl)-ethyl]-formamide thereby obtained is boiled without isolation or purification with substantially concentrated hydrochloric acid for one hour and then extracted with ether. The aqueous phase is alkalinized with soda lye. After repeated extractions with ether and drying, the free base is precipitated with ethereal hydrochloric acid as the hydrochloride. The melting point of the hydrochloride is 241–242° C. (isopropanol). The α,α-dimethyl-β-[p-bromophenyl]-ethylamine hydrochloride is obtained in a yield amounting to 70.5% of theory.

(B) *N-[α,α-dimethyl-(p-bromophenyl)-ethyl]-carbamic acid ethyl ester*

6.6 g. α,α-dimethyl-β-[p-bromophenyl]-ethylamine are dissolved in 34 ml. alcohol and under stirring and with ice cooling, rapidly combined with a solution of 3.38 g. chloro-formic acid ethyl ester in 34 ml. alcohol. To the resulting mixture there is added in dropwise fashion a saturated aqueous solution of 3 g. potassium hydrogen carbonate with cooling and with 3 hours of stirring. The alcohol is distilled off in vacuo. The residue is extracted with ether, dried over sodium sulfate, concentrated by evaporation and distilled. The boiling point of the N-[α,α - dimethyl - (p-bromphenyl)-ethyl]-carbamic acid ethyl ester at $2.10^{-3}$ mm. Hg is 92° C.; the melting point amounts to 63–64° C. The yield of recovered ester amounts to 5.2 g. (59.8% of theory).

EXAMPLE 7

(A) *α,α-dimethyl-β-[p-fluorophenyl]-ethylamine*

In the manner described in Example 6, 44.1 g. of α,α-dimethyl-[p-fluorphenyl]-ethyl alcohol are converted with 14.5 g. sodium-cyanide in sulfuric acid/glacial acetic acid into N-[α,α-dimethyl-(p-fluorophenyl)-ethyl]-formamide which is not isolated, but, as described above, hydrolized with concentrated hydrochloric acid using heat in the hydrolysis. Following alkalinization of the resulting reaction solution, the free amine is extracted with ether, the ethereal solution obtained dried, evaporated, and the residue fractionally distilled. The boiling point of the α,α-dimethyl-β-(p-fluorophenyl)-ethylamine at 4 mm. Hg is 67° C.; $n_D^{20.5}$ 1.4942. The corresponding hydrochloride has a melting point of 185–186° C. The α,α-dimethyl-β-(p-fluorophenyl)-ethylamine is recovered in an 82.5% of theory yield.

(B) *N-[α,α-dimethyl-(p-fluorophenyl)-ethyl]-carbamic acid ethyl ester*

There are added dropwise and under stirring and ice cooling to a solution of 5.77 g. chloroformic acid ethyl ester in 58 ml. alcohol, a solution of 8.25 g. α,α-dimethyl-β-[p-fluorophenyl]-ethylamine in 58 ml. alcohol. Stirring and cooling are continued and a saturated aqueous solution of 5.05 g. potassium bicarbonate is added to the resulting mixture over a period of 20 minutes. After 3 hours of stirring, followed by vacuum distillation of the alcohol, the residue is taken up in ether, dried over sodium sulfate, evaporated and the residue thereby obtained distilled. The boiling point of the N-[α,α-dimethyl-(p-fluorophenyl)-ethyl]-carbamic acid ethyl ester obtained amounts at $2.10^{-4}$ mm. Hg 87° C. The ester is recovered in an amount of 7.2 g. representing 61.4% of theory.

The compounds of the invention, as noted above, are preferably administered orally in tablets, elixers in conjunction with suitable carriers and other types of oral pharmaceutical dosage units. Where parenteral administration is indicated, the compounds are prepared in sterile solutions or suspensions.

A preferred form of administration is a capsule or tablet. The capsule may be of either the hard shell or soft shell type, is generally of gelatin, although any water-soluble capsulating material that will distintegrate after oral administration is suitable. Lubricants, such as magnesium stearate and anticaking agents to keep the drug in readily dispersible form may be incorporated in the dosage unit. When tablets are prepared, they may be made in various sizes. These are generally compounded with binding agents, lubricants, and other substances which are commonly used in tablet manufacture, such as magnesium stearate, stearic acid, talc, corn starch, lactose, or the like. If desired, these tablets may be coated with sugar or sugar-like preparations in accordance with the common practices in the tablet manufacturing art.

The compounds in accordance with the invention are primarily anorexigenic in action. They produce significant and progressive weight loss by voluntary restriction of caloric intakes. They are effective to curtail appetite without producing jitteriness, nervous tension, or disturbance of sleep of the dieting patient. They are notable for their lack of effect on blood pressure or cardiac rhythm.

The compounds in accordance with the invention have been compared with certain of the known compounds for the purpose of establishing the relatively greater effectiveness of the compounds in accordance with the invention as diet control agents. The compounds in accordance with the invention, while effective to control appetite, have remarkably low toxicity and do not tend to produce physiological disturbances, such as those mentioned above in connection with the known compounds.

The comparative data have been incorporated into a table hereinafter set forth. In this table, the appetite-curtailing effect, toxicity (LD) and motility increasing activity of a number of carbamic acid esters in accordance with the invention are shown in comparison with those of the corresponding amines. All of the experiments were carried out on rats to which the substances were administered orally. dl-Amphetamine was used as the standard substance. The per diem dose which reduced the food consumption of the experimental animals over 5 days by an average of 40% is designated as "Deff 40%" (column 2). Column 3 shows the toxicity values ($LD_{50}$ values) after a single, oral application. These are the values which were established after completing the post mortem, during a 14-day observation period. In column 4 there are shown the therapeutic ratios which can be calculated from the $LD_{50}$ and Deff 40% values. Column 5 shows the motility increasing activity in comparison with amphetamine. The motility increasing frequency was determined by the method of R. Kopf D. Lorenz. I. Möller Nielsen: Naunyn-Schmiedeberg's Arch. exp. Path. Pharmakol. 241, 185 (1960). This is expressed as the dose which doubles the motility after a single oral application by comparison with a control group. In the case of amphetamine, the corresponding dose was 6.5 mg./kg. The doses of the other substances which have the same effect are substantially higher, so that the activity based on amphetamine=100 is correspondingly smaller.

It can clearly be seen from the table that the motility-increasing activity decreases considerably in all cases. In addition, most of the examples show an increase in therapeutic range which is sometimes considerable.

Particularly thorough pharmacological and toxicological investigations were carried out in connection with the compound ethyl-N-[α,α-dimethyl-β-(p-chlorophenyl)-ethyl]-carbamate. This compound has a prolonged, i.e. long lasting effect in curtailing appetite. A single application of 29 mg./kg., produced complete inhibition of food consumption of rats for 6 hours and even after 12 hours, the food consumption was still considerably reduced.

When dl-amphetamine was used, however, the anorexia produced and there responsible for the curtailment of food intake with an equimolar dose had subsided completely after 6 hours. Experimental determinations of the blood pressure carried out on despinalized rats, narcotized guinea pigs, and narcotized cats demonstrated that with intravenous administration, a sympathomimetic activity in the form of an increase in blood pressure or contraction of the nictating membrane was not detectable. On oral administration, a sympathomimetic action was observed when the pupil test was performed on the rats. However, this only manifested itself slowly. Circulatory phenomena, such as increased heart rate or a flushed feeling, which generally occurs just after sympathomimetics have been taken orally, are not apparent, this having been confirmed by clinical tests.

In chronic toxicity tests carried out on 20 rats, the active substance was mixed in a concentration of 0.03% with the standard food. Daily consumption of active substance by the animals in this case was between 20 and 30 mg./kg. and the period of the experiment was 45 weeks. In the first 5 weeks of the experiment, the increase in the body weight lagged behind that of the control animals by about 20% because of their small consumption of food. After that body weight development proceeded concurrently and, after about 20 weeks approached the weights of the control animals to an increasing degree. In addition, chronic toxicity tests were carried out on 5 rabbits, the active substance being admixed in the food in a concentration of 0.075%. The amount of active substance ingested was similarly 20–30 mg./kg. During a 28-week feeding period, the behavior of the animals did not differ from that of the control animals, apart from an initial period of unchanged weight. Repeated checks on the functioning of the liver, using the sulfobromophthalein test, gave no indication of a hepatotoxic action.

Checks carried out at intervals of 6–8 weeks on the blood picture and urine showed no difference from the normal with both types of animals. Histological investigations carried out during and on completion of the test on dead animals showed no sign of disease. During the clinical testing of ethyl-N-[α,α-dimethyl-β-(p-chlorophenyl)-ethyl]-carbamate (partly in an open test, and partly in a blind test and double blind test) doses of 30 mg., 1–3 times per day, and later 60–90 mg., once or twice a day, were administered over 4–12 weeks to about 250 stationary and ambulatory patients. The weekly decrease in weight was at least 500 g. (maximum 2.5 kg. per week). Investigations carried out on the blood picture, hypostasis, blood pressure, pulse frequency, and on the urine for albumin, sedimentation, sugar and urobilinogen showed no changes from the normal values.

The liver function was evaluated (Takata-Ara, Weltmann-Band, cadmium and thymol turbidity test) in 15 patients and demonstrated no pathological deviation from the normal values. Experiments on function as well as biopsies of the liver tissue, carried out with 5 serious chronic sufferers from liver complaints, showed no deterioration in the results after administration of 30 mg. of ethyl N-[α,α-dimethyl - β - (p-chlorophenyl)-ethyl]-carbamate twice a day for 6–8 weeks. The subjective compatibility was good.

TABLE

| Compound | Deff 40% | | $LD_{50}$ | | $LD_{50}$:Deff 40% | Motility (Amphetamine =100) |
| --- | --- | --- | --- | --- | --- | --- |
| | Mg./kg. | Mol/kg. | Mg./kg. | Mol/kg. | | |
| dl-Amphetamine | 18 | 100 | 23 | 125 | 1.3 | 100 |
| α,α-Dimethyl-β-phenylethyl amine (Phentermin) | 20 | 107 | 90 | 480 | 4.5 | 36 |
| Ethyl-N-[α,α-Dimethyl-β-phenylethyl]-carbamate | 50 | 226 | 200 | 904 | 4.2 | 10 |
| α,α-Dimethyl-β-(p-chlorophenyl)-ethylamine (Chlorophentermine) | 15 | 69 | 230 | 1,050 | 15 | 4 |
| Ethyl-N-[α,α-Dimethyl-β-(p-chlorophenyl)-ethyl]-carbamate | 19 | 74 | 600 | 2,340 | 32 | <0.02 |
| Propyl-N-[α,α-Dimethyl-β-(p-chlorophenyl)-ethyl]-carbamate | 35 | 130 | 680 | 2,522 | 19 | <0.02 |

We claim:

1. A compound of the class having the structural formula

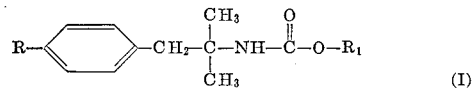

(I)

wherein R is halogen and $R_1$ is aa straight chain lower alkyl group having from 1 to 3 carbon atoms.

2. Ethyl-N-[α,α-dimethyl-β-(p-chlorophenylethyl]-carbamate.

3. n - propyl - N - [α,α-dimethyl-β-(p - chlorophenyl)-ethyl]-carbamate.

4. Methyl - N - [α,α-dimethyl-β-(p - chlorophenyl)-ethyl]-carbamate.

5. N-[α,α - dimethyl-(p-bromophenyl)-ethyl]-carbamic acid ethyl ester.

6. N-[α,α - dimethyl - (p - fluorophenyl)-ethyl]-carbamic acid ethyl ester.

7. A therapeutic composition in effective dosage unit form useful for curtailing appetite comprising a chemical compound of a class having the structural formula:

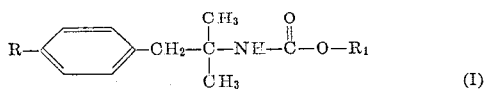

wherein R is halogen and $R_1$ is a straight chain lower alkyl group having from 1–3 carbon atoms, as the active ingredient admixed with a physiologically acceptable carrier.

8. A therapeutic composition in effective dosage unit form useful in curtailing appetite comprising a therapeutically effective quantity of ethyl-N-[α,α-dimethyl-β-(p-chlorophenyl)-ethyl]-carbamate and a pharmaceutical carrier.

9. A therapeutic composition in effective dosage unit form useful for curtailing appetite comprising a chemical compound selected from the class having the structural formula

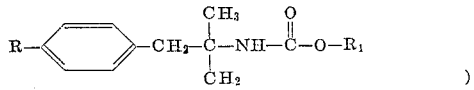

wherein R is halogen, and $R_1$ is a straight chain lower alkyl group containing from 1–3 carbon atoms as active ingredient admixed with a physiologically acceptable solid carrier.

10. A method of curtailing appetite which comprises administering to a dieting patient a therapeutic composition in effective dosage unit form comprising a compound having the structural formula:

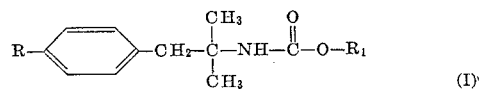

wherein R is halogen, $R_1$ is a straight chain lower alkyl group having from 1–3 carbon atoms, as active ingredient combined with a pharmaceutical carrier.

References Cited by the Examiner

UNITED STATES PATENTS 2,041,733  5/1936  Werntz _____ 260—471
2,651,658  9/1953  Bohl _____ 260—471

FOREIGN PATENTS 672,971  3/1939  Germany.

OTHER REFERENCES

American Journal of Pharmacy, vol. 134, page 22.
Marsh, Chemical Abstracts 43, 759d (1949).
Optiz, Chemical Abstracts 55, 8658f (1961).
Bougault et al., Compt. Rend 213, 310–313 (1941).
Gutsche et al., J. Am. Chem. Soc. 79, 4441–4448 (1951).
Bennington et al., J. Org. Chem. 23, 1979–1984 (1958).
Burger, Medicinal Chemistry (1960 edition) pages 598–599.
Rinkes, Rec. Trav. Chim. 46, 268–277 (1927).

LORRAINE A. WEINBERGER, *Primary Examiner.*

DANIEL D. HORWITZ, *Examiner.*

L. A. THAXTON, *Assistant Examiner.*

UNITED STATES PATENT OFFICE
CERTIFICATE OF CORRECTION

Patent No. 3,308,019                               March 7, 1967

Rudolf Kopf et al.

It is hereby certified that error appears in the above numbered patent requiring correction and that the said Letters Patent should read as corrected below.

In the heading to the printed specification, line 6, for "Kleinhurden Post" read -- Kleinhurden Post Immekeppel --; line 8, for "assignors to Tropon Dinklage & Co." read -- assignors to Tropon Werke Dinklage & Co. --; column 2, lines 43 and 58, and column 3, lines 3 and 36, for "ethyl]carbamate", each occurrence, read -- ethyl]-carbamate --; column 3, line 12, for "α,α,-dimethyl-β-(p-chlorophenyl) ethyl" read -- α,α-dimethyl-β-(p-chlorophenyl)-ethyl --; line 26, for "n-Propyl—N[α,α-dimethyl-β-(p-chlorophenyl)" read -- n-Propyl-N-[α,α-dimethyl-β-(p-chlorophenyl) --; column 4, line 67, for "intakes" read -- intake --; column 6, line 70, for "aa" read -- a --; line 72, for "(p-chlorophenylethyl" read -- (p-chlorophenyl)ethyl --; column 7, lines 27 to 31, the formula should appear as shown below instead of as in the patent:

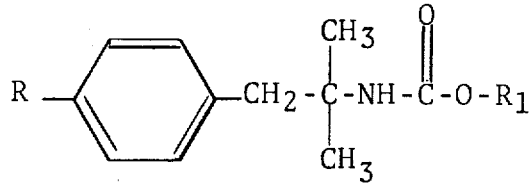

column 8, line 27, for "(1951)" read -- (1957) --.

Signed and sealed this 28th day of November 1967.

(SEAL)
Attest:

EDWARD M. FLETCHER, JR.                        EDWARD J. BRENNER
Attesting Officer                                    Commissioner of Patents